March 5, 1929.  J. J. SCHNEIDER  1,704,346
BABY WALKER
Filed March 13, 1926  6 Sheets-Sheet 1
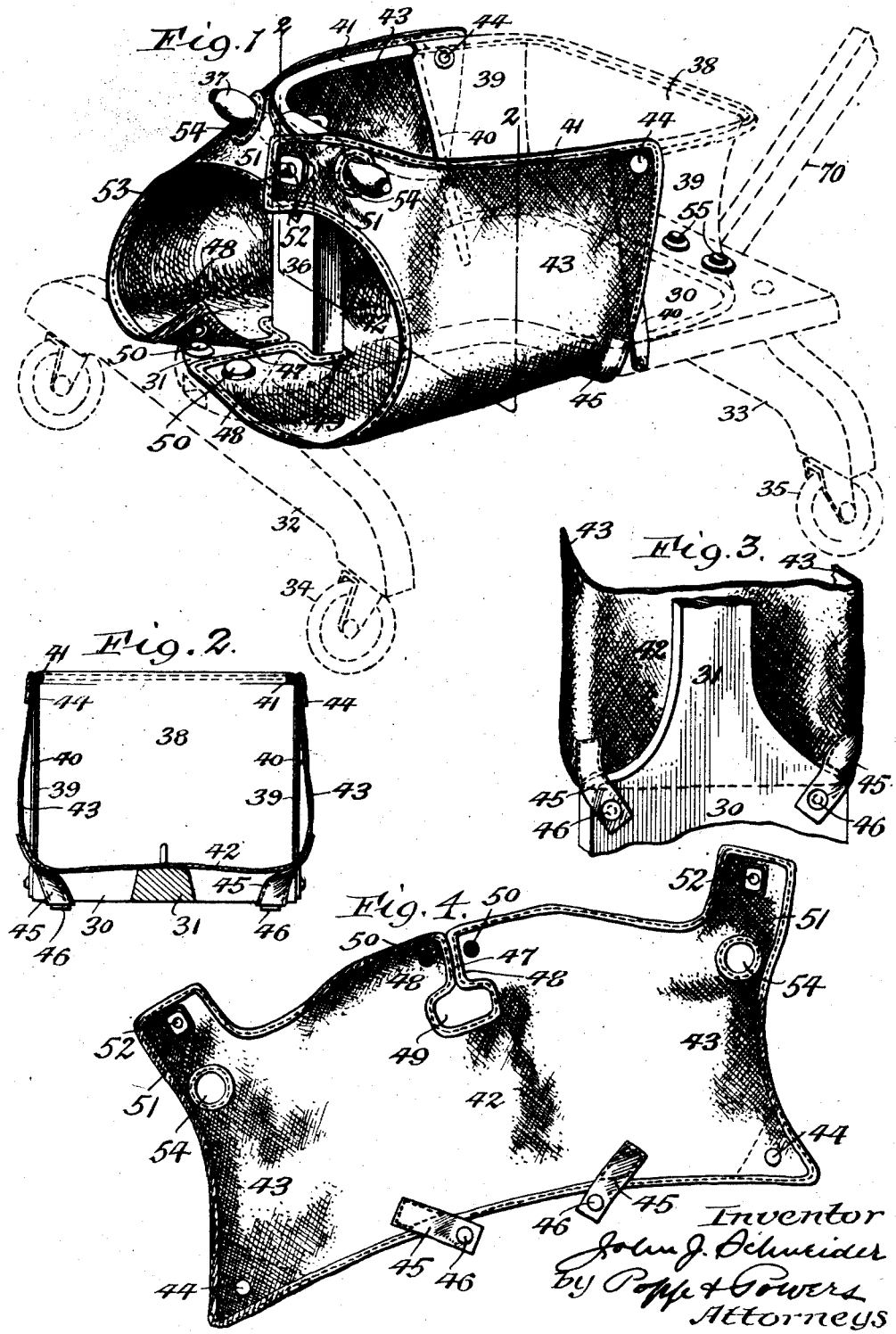

March 5, 1929.                    J. J. SCHNEIDER                    1,704,346
BABY WALKER
Filed March 13, 1926                                    6 Sheets-Sheet 2
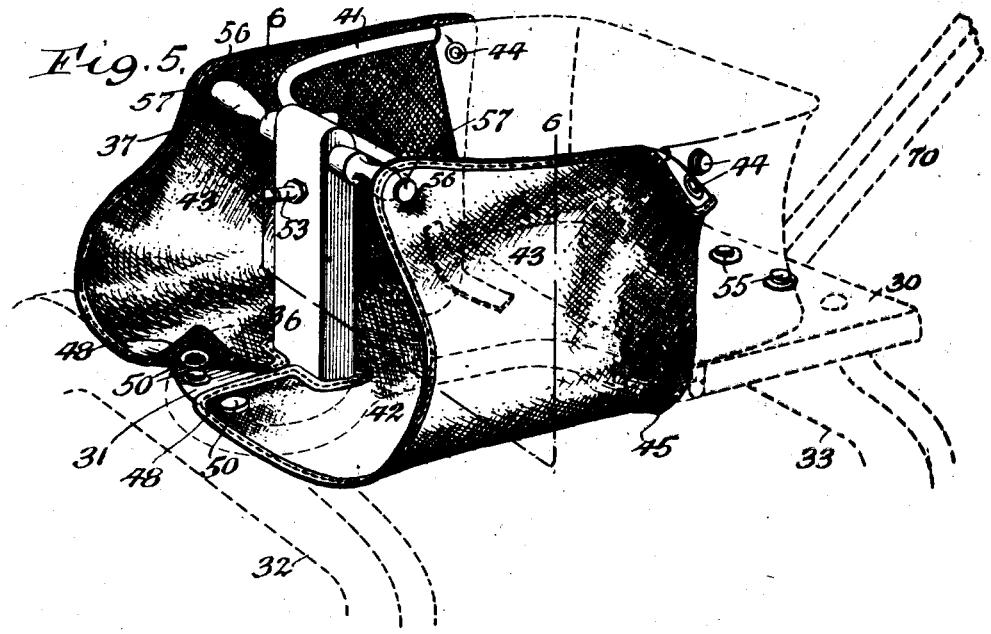
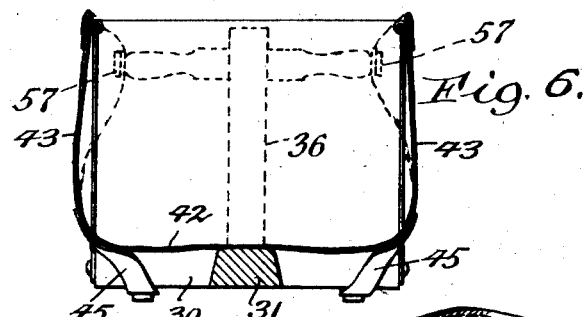
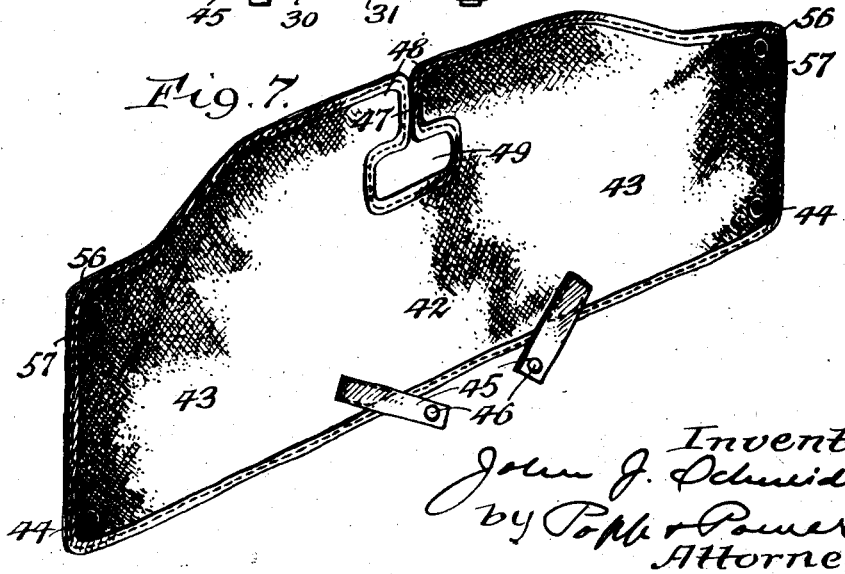
Inventor
John J. Schneider
by Popp & Powers
Attorneys March 5, 1929.  J. J. SCHNEIDER  1,704,346
BABY WALKER
Filed March 13, 1926    6 Sheets-Sheet 3
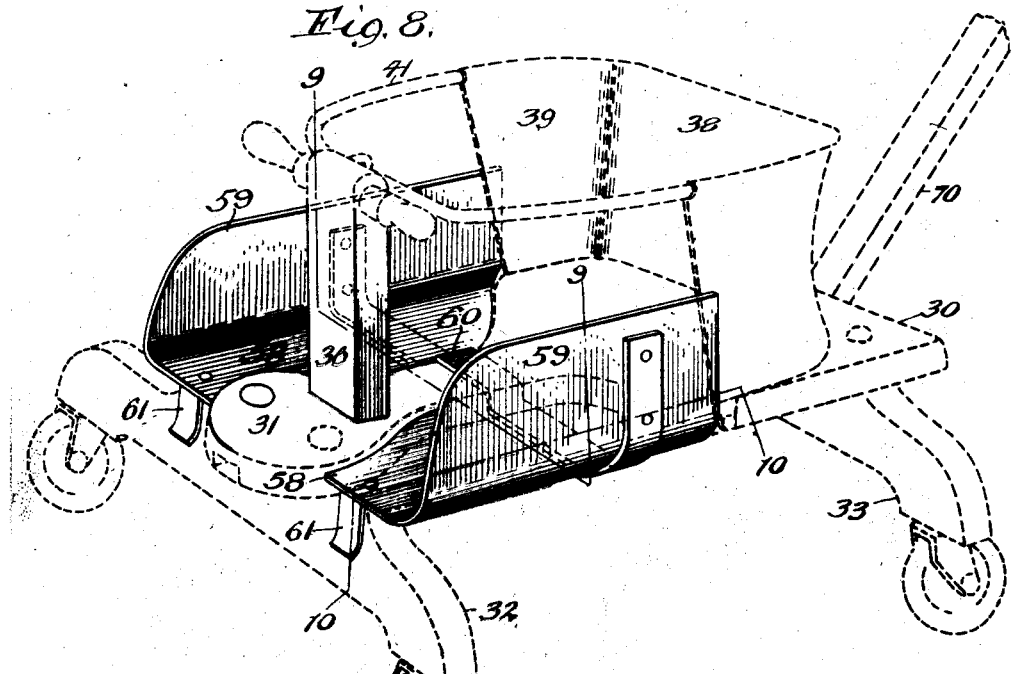
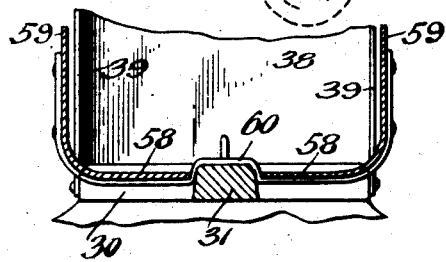
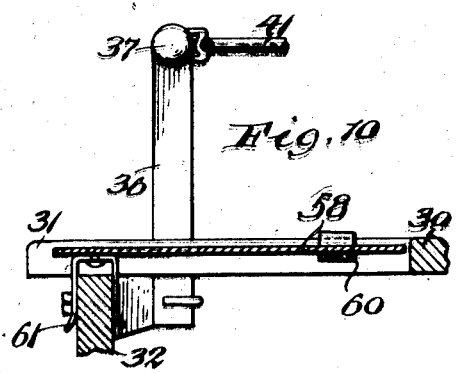
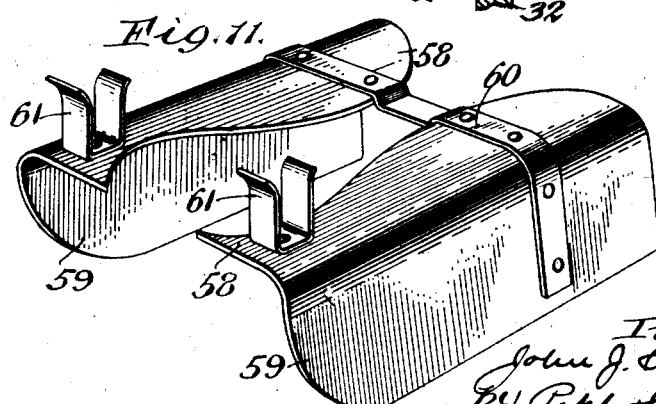
Inventor
John J. Schneider
By Pople & Powers
Attorneys March 5, 1929. J. J. SCHNEIDER 1,704,346
BABY WALKER
Filed March 13, 1926 6 Sheets-Sheet 4
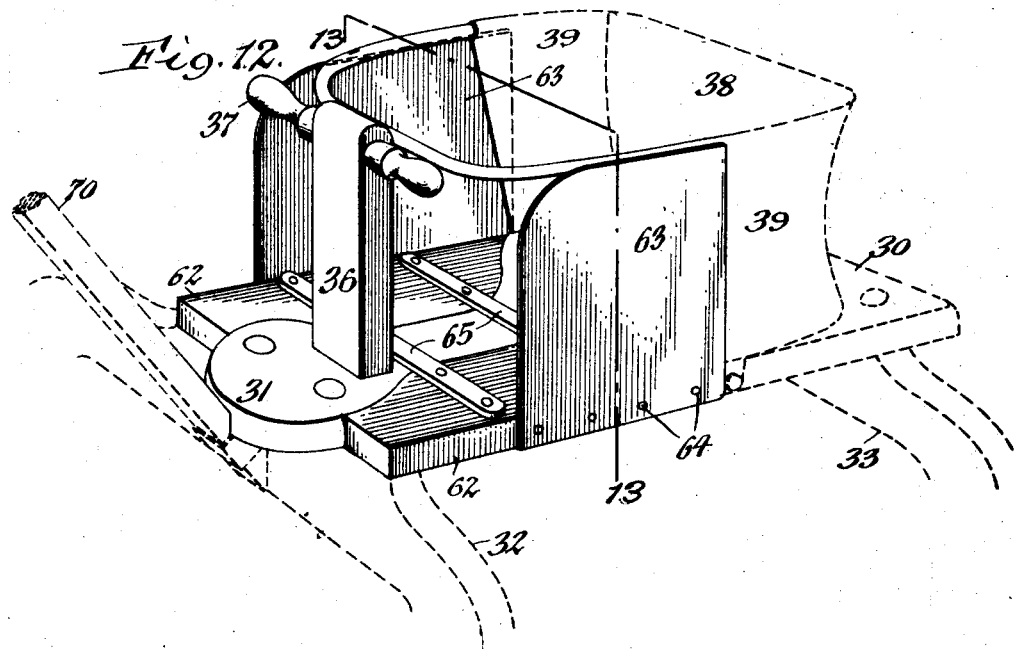
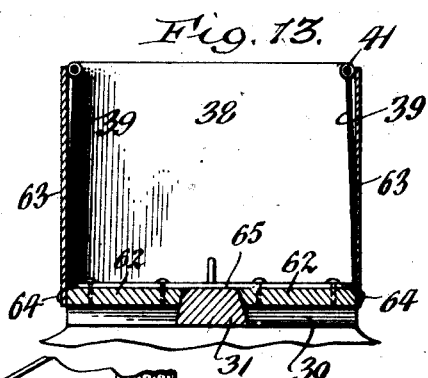
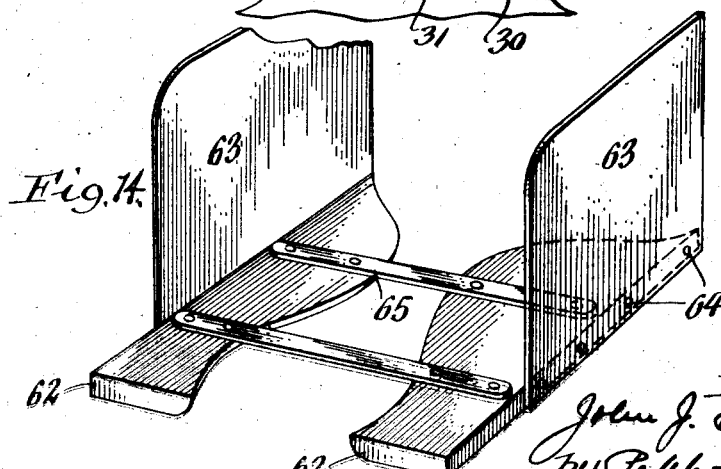
Inventor
John J. Schneider
by Parker & Powers
Attorneys March 5, 1929.   J. J. SCHNEIDER   1,704,346
BABY WALKER
Filed March 13, 1926    6 Sheets-Sheet 5
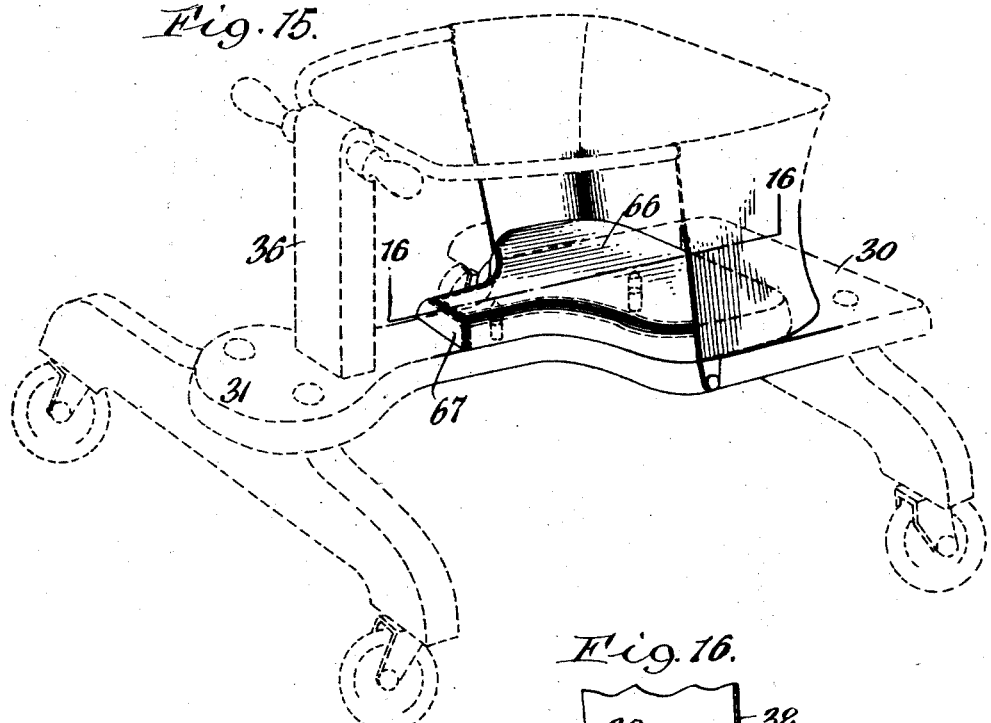
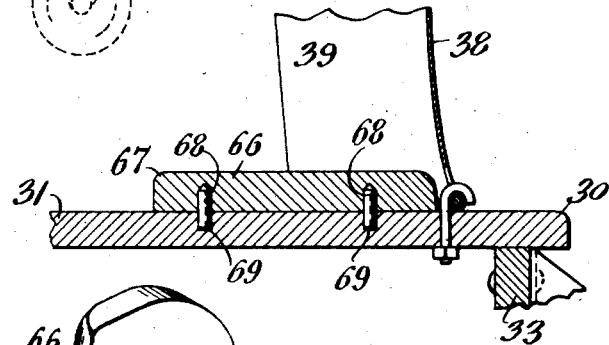
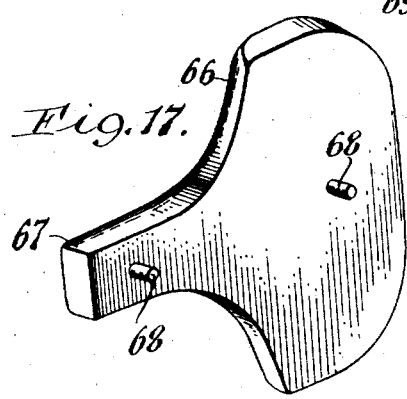
Inventor
John J. Schneider
by Pipp & Powers
Attorneys March 5, 1929. J. J. SCHNEIDER 1,704,346
BABY WALKER
Filed March 13, 1926 6 Sheets-Sheet 6
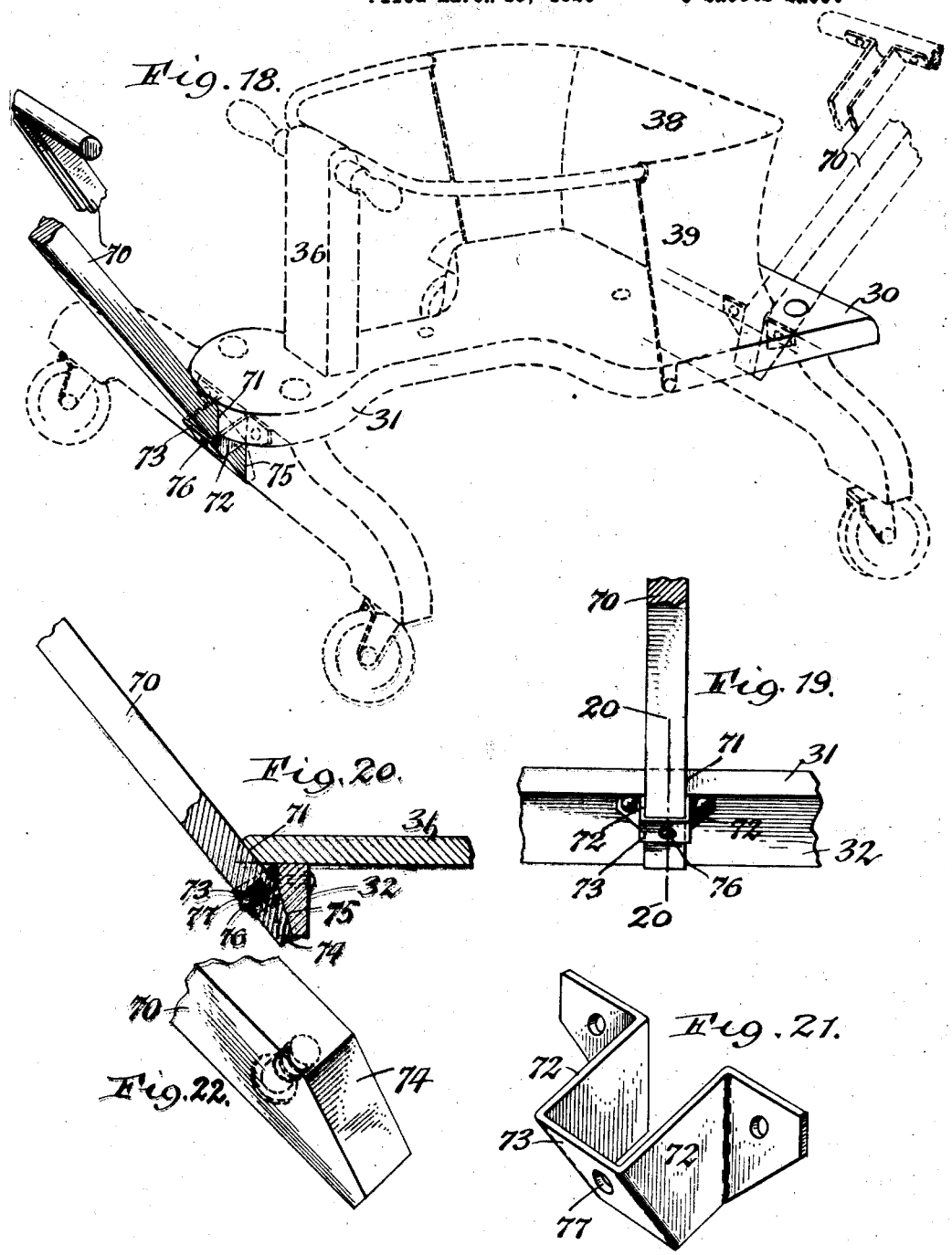
Inventor
John J. Schneider
by Popp & Powers
Attorneys Patented Mar. 5, 1929.

1,704,346

UNITED STATES PATENT OFFICE.

JOHN J. SCHNEIDER, OF BUFFALO, NEW YORK.

BABY WALKER.

Application filed March 13, 1926. Serial No. 94,465.

This invention relates to a baby walker whereby a child while seated can push itself by the feet over a floor and thus aid in teaching the child without tiring the same or endangering its health or physique.

One of the purposes of this invention is to provide safety means whereby a child may push a baby walker by its feet over the ground or floor in the usual manner and also permit of holding the child's legs above the ground or floor and prevent the same from dragging and liable to become injured when the baby walker is pushed or pulled by an attendant, such safety means being so organized that the same are movably mounted on the body of the baby walker so that the same can be rendered operative or inoperative.

Another object of this invention is to permit of raising the seat of the baby walker to compensate from the increasing size or growth of the child and permit the same to use the baby walker with greater comfort and pleasure.

A further aim of this invention is to provide simple and efficient means for detachably connecting a handle to the body of the baby walker so that the same may be conveniently pulled or drawn as best suit the particular conditions.

In the accompanying drawings:—

Figure 1 is a perspective view showing a satisfactory form of the safety attachment embodying my invention.

Figure 2, is a cross section of the same taken on line 2—2, Fig. 1.

Figure 3, is a fragmentary bottom plan view of the construction shown in Figs. 1 and 2.

Figure 4, is a perspective view of the safety attachment shown in Figs. 1 and 2.

Figure 5, is a fragmentary perspective view of a baby walker showing a modified form of my safety attachment.

Figure 6, is a cross section of the same taken on line 6—6, Fig. 5.

Figure 7, is a detached perspective view of the safety attachment shown in Figs. 5 and 6.

Figure 8, is a fragmentary perspective view showing another form of my invention.

Figure 9, is a cross section on line 9—9, Fig. 8.

Figure 10, as a fragmentary vertical longitudinal section taken on line 10—10, Fig. 8.

Figure 11, is a perspective of the closure for baby walkers shown in Figs. 8, 9 and 10.

Figure 12, is a perspective view of a baby walker showing another embodiment of my closure attachment.

Figure 13, is a vertical cross section of the same taken on line 13—13, Fig. 12.

Figure 14 is a perspective view of the closure attachment shown in Figs. 12 and 13.

Figure 15, is a perspective view of a baby walker having the main seat and reach of the body provided with a removable supplemental seat to accommodate the growth of a child.

Figure 16, is a fragmentary vertical longitudinal section taken on line 16—16, Fig. 15.

Figure 17, is a perspective view of a supplemental seat shown in Figs. 15 and 16.

Figure 18, is a perspective view of a baby walker equipped with my detachable handle.

Figure 19, is a fragmentary end view of the same.

Figure 20, is a vertical section taken on line 20—20, Fig. 19.

Figure 21, is a perspective view of the bracket which receives the handle.

Figure 22, is a similar view of the handle.

Similar characters of reference indicate like parts in the several figures of the drawings.

The body of the baby walker may be of any suitable construction, that shown in the drawings being made of a flat board which is shaped to form a rear wide main seat 30 and a front narrow reach or neck 31 projecting forwardly from the main seat. This body may be provided with supporting means of any approved construction which permit of easily moving the same over the floor or ground, the means for this purpose shown in the drawings consisting of front and rear bolsters 32, 33 secured transversely to the underside of the front and rear ends of the body, and front and rear rollers or wheels 34, 35, mounted on the ends of the front and rear bolsters, respectively, and adapted to run on the floor, ground or roadway.

Rising from the front end of the narrow reach of the body, is a post 36 which is provided at its upper end with a transverse handle bar 37 which may be grasped by the hands of a child which is occupying the main seat of the body and has its legs astride of the narrow reach or neck. While the child is thus mounted on the baby walker it can propel the same by pushing its legs on the floor and thereby gradually learn to walk without undue effort or liability of injuring itself. For the purpose of holding the child on the baby walker while thus employed its body is supported by a back rest or wall 38 rising from the rear part of the main seat and two side rests or walls 39 projecting forwardly from the back wall, these walls being preferably constructed of canvas, leather or other pliable material and mounted on a frame 40 of wire secured to the body and having its upper parts 41 extending from the upper edges of the side rests to the upper end of the posts. By means of this support the child is prevented from falling off the baby walker and still can make free use of its legs to push itself over the floor and thereby get exercise and learn to walk.

At times the attendant of the child wishes to push or pull the baby walker for a considerable distance, while occupied by the child at which times it is undesirable for the legs of the child to hang and engage the ground because the same are liable to be distorted and injured. In order, therefore, to permit of supporting the legs of the child in an elevated position in which the same do not strike the ground or road an enclosure is provided which embodies my invention and which in the form shown in Figs. 1-4 is constructed as follows:—

The closure is preferably constructed of canvas or similar pliable material to form a lower horizontal bottom 42 which extends over the narrow reach or neck of the body and across the spaces on opposite sides of the same and two upright side walls 43, 43 rising from opposite longitudinal edges of the bottom and extending forwardly from the front edges of the side rests of the main seat.

This closure may be mounted on the baby walker in various ways so that it is movable thereon and capable of being either wholly detached therefrom or the same may be folded backwardly into a position in which the closure is inoperative. A suitable manner for thus connecting the closure with the baby walker is shown in Figs. 1-4 the same being constructed as follows:—

The numeral 44 represents two press buttons whereby the upper rear corners of the closure are detachably connected with the upper front corners of the side rests of the baby walker. At its lower rear corners the closure is provided with rearwardly projecting tabs 45 which are detachably connected by press buttons 46 with the underside of the main seat of the baby walker, as shown in Figs. 2 and 3. In its front part the bottom is provided with a longitudinal slit 47 extending rearwardly from the front edge thereof thereby forming two front tabs 48. These tabs receive between them the post of the baby walker for which purpose the rear end of the slit 47 is enlarged to form a clearance space, as shown at 49 to accommodate the post. These tabs 48 are detachably connected by spring press buttons 50 with the upper side of the reach portion of the body in front of the post, as shown in Fig. 1. The upper front parts of the side walls of the closure are provided with forwardly projecting tabs 51, the forward extremities of which are provided with eyes 52 which are adapted to be engaged one over the other with a forwardly projecting pin 53 on the upper part of the front side of the post and detachably connect these parts, as shown in Fig. 1. In addition to this the tabs 51 may be provided in rear of their eyes 52 with intermediate holes 54 into which the opposite ends of the handle bar may be engaged for maintaining the side walls of the closure in an upright position.

When the closure is thus applied to the baby walker the same together with the body, back and side rests and the post form a compartment which is open at the top for the introduction and removal of the child and two front openings or passages for the legs of the child whereby the latter is securely confined against falling out of the baby walker and its legs are held up so that they cannot drag on the ground or floor and no possible injury can therefore befall the child.

If at any time it is desired to permit the child to lower its legs on to the floor or ground and push itself around this can be done by either removing the closure entirely from the baby walker, or the front parts only of the same may be detached from the post, handle bar and reach and then rolled or folded backwardly on the rear parts of the closure in which folded position the closure may be retained by engaging the sockets of the press buttons of the lower front tabs 48 with knobs 55 arranged on the upper side of the rear part of the main seat.

Instead of slipping the upper front tabs over the ends of the handle bar, the holes 54 in these tabs may be omitted, in which case the upper front parts of the closure side walls are supported only on the pin 53. If desired the upper front parts of the closure side walls may be provided with shorter tabs 56 which are detachably connected with the opposite ends of the handle bar by spring or friction press buttons 57, as shown in Figs. 5, 6 and 7. In this construction the child may also be supported with its feet off the ground and the feet may drop on the ground by wholly removing the closure from the baby walker or by rolling the same back and fastening it on the rear of the body.

Obviously the purposes of this invention can be accomplished by the use of material which is practically rigid instead of being pliable. For example as shown in Figs. 8-11 the closure has its bottom constructed of two fiber or cardboard sections 58 which are adapted to fit the spaces on opposite sides of the reach and in front of the main seat, and the side walls 59 of the same are also constructed of fiber or cardboard, each formed integrally with one of the bottom sections and projecting upwardly from the outer longitudinal edge thereof. The two bottom sections in this instance are connected by a cross bar 60 resting on top of the reach and the closure is detachably connected with the baby walker by two U-shaped spring clips 61 projecting downwardly from the underside of the front ends of the bottom sections and each straddling the adjacent upper part of the front bolster, as shown in Figs. 8 and 10.

Another form in which my invention may be carried out is shown in Figs. 12, 13 and 14. Here the bottom sections 62 of the closure are made of comparatively thick wood and the side walls 63 of fiber or the like and secured at their lower edges by nails 64 or other suitable fastening to the outer longitudinal edges of the bottom sections. The two bottom sections are connected by two cross bars 65 resting on top of the reach of the body.

In the several forms of the closure herein shown and described it is possible to apply the same quickly and easily to the baby walker on holding the legs of the child above the ground and also readily and conveniently detach the same from the baby walker so that the latter can be employed as usual by the child in learning how to walk.

As the child becomes older and grows in height it is desirable to raise the level of the seat in order to compensate for the increased length of the legs and enable the child to use the baby walker with greater comfort and benefit.

With this end in view the present invention provides a supplemental seat 66 which is adapted to rest on the main seat so as to raise the effective height of the surface on which the body of the child is supported. This supplemental seat is preferably provided with a forwardly projecting shank 67 adapted to rest on the adjacent part of the reach or neck of the body. Any suitable means may be provided for detachably connecting the supplemental and main seats, for example, two dowels 68 may be employed which are fixed on the underside of the supplemental seat and engage with openings 69 on the top of the main seat, as shown in Fig. 16.

For the purpose of permitting the baby walker to be conveniently and easily pushed or pulled a handle 70 is provided which may be detachably connected with either end of the baby walker in the following manner and as shown in Figs. 18-21:—

At each end of the body the same is provided with a notch 71. Below each notch a bracket is arranged which has two longitudinal walls 72 having their inner ends connected with the outer side of the adjacent bolster while their outer ends are connected by an inclined transverse wall 73 which walls together with said bolster form a socket. The handle 70 is engaged with said notch and pushed with its lower end into said socket until the lower beveled rear face 74 of the handle engages with a notch 75 in the outer side of the bolster. The handle is held in this position by a frictional interlocking mechanism consisting of a spring pressed catch 76 arranged on the outer side of the handle and engaging with a perforation 77 in the inclined wall of the socket. By this means the handle can be readily applied to the baby walker and removed therefrom as desired without much effort by simply pushing the same into one of the sockets or pulling the same therefrom.

I claim as my invention:—

1. A closure for a baby walker having a horizontal body provided with a wide rear part forming a seat and a narrow front part forming a reach, a post rising from the narrow front part of said body, and an upright back and side rest mounted on the rear seat portion of the body, said closure comprising a horizontal bottom adapted to close the space on opposite sides of the narrow reach and two upright side walls rising from opposite edges of the bottom and extending forwardly from the side rests, and means for detachably connecting said closure with said body and post.

2. A closure for a baby walker having a body provided with a wide rear seat and a narrow front reach, a post rising from said reach, and a back rest mounted on the rear part of said seat and provided with side rests extending forwardly from opposite edges thereof, said closure comprising a sheet of pliable material having a bottom adapted to extend horizontally over the reach and across the spaces on opposite sides of the same and side walls extending upwardly from opposite edges of said bottom and forwardly from said side rests and said bottom provided in its front part with a longitudinal slit forming two tabs arranged on opposite sides of said post.

3. A closure for a baby walker having a body provided with a wide rear seat and a narrow front reach, a post rising from said reach, a back rest mounted on the rear part of said seat and provided with side rests extending forwardly from opposite edges thereof, said closure being constructed of pliable material, and having a bottom adapted to extend horizontally over the reach and across the spaces on opposite sides of the same and side walls extending upwardly from opposite edges of said bottom and forwardly from said side rests and said bottom provided in its front part with a longitudinal slit forming two tabs and the rear part of said slit being enlarged to form a clearance which receives said post.

4. A closure for a baby walker having a body provided with a wide rear seat and a narrow front reach, a post rising from said reach, a transverse handle bar mounted on the upper end of said post, and a back rest mounted on the rear part of said seat and provided with side rests extending forwardly from opposite edges thereof, said closure being removable and constructed of pliable material, and having a bottom adapted to extend horizontally over the reach and across the spaces on opposite sides of the same and side walls extending upwardly from opposite edges of said bottom and forwardly from said side rests, the upper part of said side walls being provided with forwardly projecting tabs each of which is adapted to be secured to said post and provided with a hole which receives the respective end of the handle bar.

In testimony whereof I affix my signature.

JOHN J. SCHNEIDER.